June 26, 1962 W. N. CARROLL 3,041,474

DATA STORAGE CIRCUITRY

Filed Feb. 24, 1958

Inventor
William N. Carroll
by Edgar H. Kent
Atty.

1

3,041,474
DATA STORAGE CIRCUITRY

William N. Carroll, Wappingers Falls, N.Y., assignor to International Business Machines Corporation, New York, N.Y., a corporation of New York Filed Feb. 24, 1958, Ser. No. 717,095
2 Claims. (Cl. 307—88.5)

Figure 1:
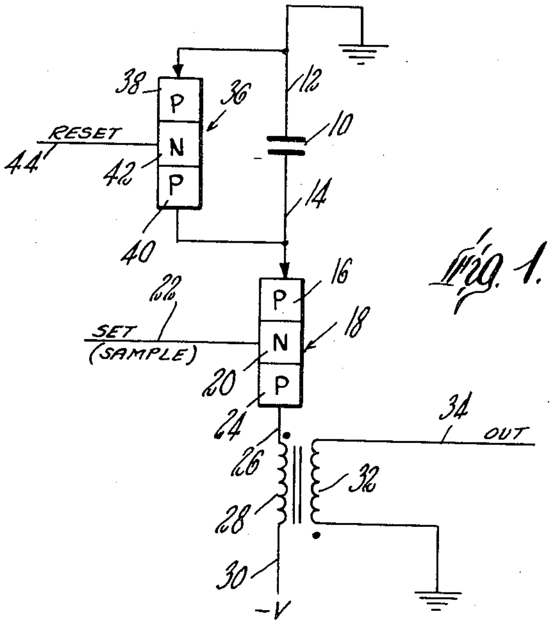

This invention relates to data storage apparatus, and more particularly to high speed data storage apparatus for use in electronic computers and including transistor-capacitor circuitry.

With the increasing demand for and application of digital computer in a variety of environments, the search for higher speed, more efficient and more compact circuit components for utilization in these computers has been intensified. Among the basic components of a digital computer are its data storage sections, for example, its memories and registers. In high speed digital computers presently commercially utilized, such storage elements frequently include magnetic core circuitry. In order to store binary information in a core it is necessary to place the core in the desired state of magnetization and this operation requires a time in the order of several microseconds. In order to increase the operating speed of digital computers it is necessary to devise storage means capable of handling binary information at much faster rates.

Accordingly, a primary object of this invention is to provide a high speed data storage device.

Another object of the invention is to provide a basic data storage circuit susceptible of incorporation into a variety of logical circuit configurations suitable for use in a parallel-organized computer of the pulse type.

Another object of the invention is to provide pulse storage circuitry whereby a standard output pulse may be produced substantially independent of the shape of the input pulse.

The circuitry according to the preferred embodiment of this invention is adapted to be utilized in a parallel-organized computer operating in pulse logic. The computer uses a negative 10 volt power supply and operates at pulse frequencies in excess of 10 megacycles per second. The elements utilized in the circuitry include a high speed PNP drift transistor, a capacitor and a coupling transformer. The transistor is utilized in the grounded emitter configuration as an active element and the circuit provides an overall power gain such that each storage circuit is capable of driving a load of six 70 ohm coaxial lines or fifteen transistors. The pulse inputs are one volt negative, one-half sine wave pulses having a maximum width of 40 millimicroseconds. The basic circuit provides degeneration in the emitter circuit such that the dependence of circuit performance upon beta (the power gain of the transistor) is minimized. The output pulse shape is determined by the interrelated characteristics of the capacitor and output transformer such that the optimum output pulse is assured. Power during each pulse is limited to a peak of 80 milli-watts with an average of 50 milli-watts. When operating at 10 megacycles with a 40 milli-microsecond pulse the average power per cycle is 20 milli-watts, and, thus, the power requirements of this circuit are much less than comparable magnetic core storage media. The circuit produces an output simultaneously with the charging of the capacitor and, much like the magnetic core, the information stored therein is destroyed during read out. Therefore provisions must be made to replace the information if such is to be retained.

The circuit is useful as a basic storage circuit and it may also be combined with other elements to perform a variety of logical functions; for example, a bistable device operating in pulse logic as described in my concurrently filed application Serial Number 716,969.

2

Similar pulse storage circuitry is disclosed in copending application Serial Number 401,568 filed December 31, 1953, by George D. Bruce, entitled Electric Charge Storage Apparatus, now abandoned and in Patent No. 2,925,585 which issued on February 16, 1950, from the continuation application, Serial No. 761,656. However, that circuitry produces an output pulse on discharge of a previously charged capacitor. The energy source for the production of the output pulse is solely the stored energy of the capacitor. Further, both terminals of a transformer are connected into the storage circuit, necessitating its physical location as a practical matter, adjacent the transistor capacitor components of the circuit. Also, the pulse storage circuit of the present invention is more suitable for incorporation in certain computer subcircuitries.

Other features, objects and advantages of the invention will be understood as the description of the preferred embodiment and a logical application thereof progresses.

Figure 2:
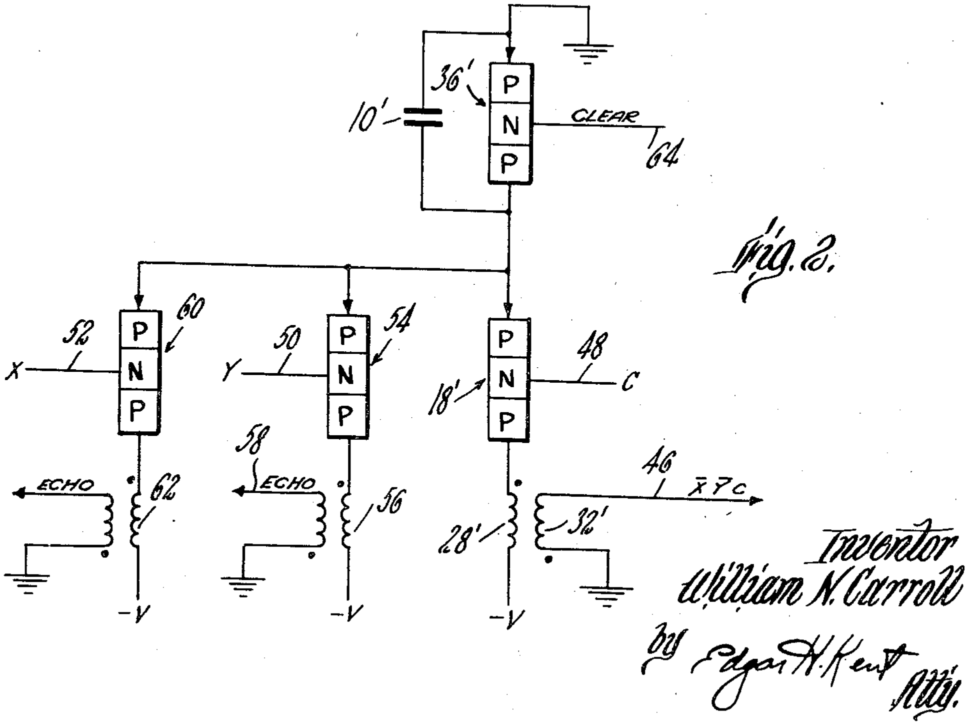

In the drawings:

FIG. 1 is a schematic diagram of the electric circuit according to the preferred embodiment of the invention; and FIG. 2 is a schematic diagram of an electric circuit in which the invention is used in a logical application.

With reference to FIG. 1, a capacitor 10 has one terminal 12 connected to ground and the other terminal 14 connected to the emitter 16 of a transistor 18. The base 20 of the transistor is connected to a line 22 labeled Set (Sample) and the collector 24 is connected to one terminal 26 of the primary winding of a transformer. The other terminal 28 of the primary winding is connected to a source of negative potential (not shown). In the preferred embodiment the potential of the unidirectional energy source is 10 volts negative. The value of capacitor 10 may be 470 mmf.

The transistor 18 is preferably a PNP graded base drift transistor (of the junction type) and may be the commercially available Philco T1231 transistor. The transistor is connected in grounded emitter configuration. This connection produces a current gain and a phase inversion relative to a signal applied to the base.

The grounded emitter connection of transistor 18 is preferable as it produces more power gain. In addition, in the drift transistors used in the circuit a voltage limitation in the reverse bias direction of one and one-half volts is imposed. By utilizing this connection it is not necessary to use a separate voltage supply in order to avoid exceeding this limitation.

When the voltage supply is first turned on, the capacitor 10 is discharged completely and no charging current flows due to the blocking effect of the transistor 18. An input pulse, one volt negative, half-sine wave, 40 millimicroseconds maximum width, is applied to the base 20 over line 22. This input pulse will cause the transistor 18 to conduct such that capacitor 10 is charged down to approximately one volt negative and a current of approximately 20 milliamperes flows through primary winding 28 of the transformer.

The transformer has a step down turns ratio of 8 to 1 between the primary winding 28 and secondary winding 32 and current flow in the primary winding produces, as an output on line 34, a one volt negative pulse of the standard shape.

The capacitor, being charged to a potential of one volt negative, biases the emitter 16 such that a subsequent one volt negative pulse, applied on line 22, will not cause the transistor 18 to conduct. Circuitry, in logical applications, incorporating this basic circuit, is designed with the criterion that under the worst conditions, the capacitor 10 will retain a sufficient charge to inhibit conduction by transistor 18 for a 10 microsecond period subsequent to the charging thereof. This criterion primarily requires a consideration of the current leakage paths in the proposed design. While the capacitor is so charged the transistor cannot produce an output pulse in response to an input pulse. If an input pulse should be applied to line 22 during this period, however, the capacitor 10 will be recharged down to the one volt negative level and thus transistor operation will be inhibited for another period of at least 10 microseconds.

In summary, the circuit produces a shaped output pulse on line 34 in response to a pulse on line 22 if the capacitor 10 is discharged, but does not produce an output pulse if the capacitor is charged. Thus, a binary digit of information will be stored in the circuit as represented by the charge or no charge on the capacitor.

Connected across the terminals 12 and 14 of the capacitor 10 is the output circuit of a second transistor 36. It also is preferably connected in the grounded emitter configuration, i.e., the emitter 38 is connected to capacitor terminal 12 and the collector 40 is connected to terminal 14. A reset pulse is applied to the base 42 over line 44. If the capacitor 10 is charged, a pulse applied to the base of the transistor 36 produces current flow through the transistor and thereby discharges the capacitor 10. No output pulse is generated during the discharge of the capacitor.

The transistors used in the preferred embodiment have a gain (beta) of approximately ten. Transistor 18 is operated in a linear region while transistor 36 is operated in the saturated region. As transistor 36 is not in the output circuit, its operation does not affect the shape of the output pulse, and the combined characteristics of the capacitor and transformer provide the necessary pulse shaping.

The circuitry is adapted for high speed operation. For example, the time between the initiation of an input pulse and the generation of an output pulse may be of the order of fifteen milli-microseconds, this interval allowing for one and one-half milli-microseconds delay in the output transformer, five milli-microseconds for the collector current to be turned On after the pulse is applied to the base and approximately eight milli-microseconds between pulse initiation and application of the pulse to the base. The reset cycle may have about the same time interval so that the Set-Reset cycle occupies about thirty milli-microseconds.

This circuit may be used as shown, no resistors for current limiting etc., being required. Resistances to ground in the pulse generating equipment to which lines 22 and 44 are connected insure that the bases of the transistors will not be floating.

A logical application of the pulse storage circuit is shown in FIG. 2. In this application it is desired to produce a pulse on line 46 only if there has been a pulse on line 48(C) and no pulses on lines 50(Y) and 52(X).

The same numerals are utilized to represent the basic circuit with the addition of primes to distinguish them. Thus, the capacitor is indicated by the numeral 10' and the primary winding of the output transformer is indicated by 28'.

The signals on lines 50 and 52 are timed to arrive ahead of the carry signal on line 48. Thus, if a signal arrives on line 50, the transistor 54 conducts and the capacitor 10' is charged. This charging current may be utilized, in transformer 56, to produce an echo pulse on line 58 which is returned to the sending equipment, thereby checking the accuracy of the data transmission. An identical transistor 60 and transformer 62 are associated with lead 52. Thus, a pulse on either line 50 or 52 will charge capacitor 10' such that no output pulse will be produced if line 48 is pulsed within the next ten microseconds. If, however, no pulse occurs on line 50 or 52 and a pulse does occur on line 48 the capacitor is charged, and current flows in winding 28' which induces an output pulse in winding 32' and on line 46. This pulse conveys the desired information; namely the presence of a pulse on line 48 and the absence of pulses on lines 50 and 52.

A signal may be applied on line 64 to the base of transistor 36' thereby discharging the capacitor 10' and resetting or restoring the circuit.

It will thus be seen that the invention provides a high speed pulse storage circuit suitable for many applications in digital computers. The circuitry may be combined with other elements in a variety of ways and to produce a variety of results. Certain modifications of the invention will be obvious to those skilled in the art, and it is not intended that the invention be limited to the preferred embodiment or to details thereof and departures may be made therefrom within the spirit and scope of the invention as defined in the following claims.

I claim:

1. Data storage apparatus for the storage of pulses representative of binary coded data comprising a first transistor having an input circuit and an output circuit, said output circuit having first and second terminals a series circuit including a data storage capacitor, the output circuit of said first transistor and an output load impedance, said capacitor being connected to the first terminal of said output circuit and said output load impedance being connected to the second terminal of said output circuit, a source of unidirectional electrical energy connected across said series circuit, the input circuit of said first transistor being adapted in response to a sampling pulse to permit a capacitor charging current to flow through said series circuit in response to said sampling pulse when said capacitor is in a discharged state, thereby simultaneously producing an output signal indicative of the value stored in said data storage apparatus and charging said capacitor, said capacitor, when charged, being adapted to inhibit turn on of said transistor, capacitor discharge means including a normally open capacitor discharge circuit connected to said capacitor and means to close said data storage capacitor discharge circuit to discharge said capacitor, a second transistor having an input circuit and an output circuit, the output circuit of said second transistor being connected in parallel with the output circuit of said first transistor and said output load impedance, whereby a pulse applied to the input circuit of said second transistor, when said capacitor is discharged, charges said capacitor so that the generation of output signals in response to subsequent signals applied to the input circuit of said first transistor is inhibited.

2. The apparatus as claimed in claim 1 and further including a transformer in series with said output circuit of said second transistor, to develop an echo pulse upon the application of an input pulse to said second transistor whenever said capacitor is discharged.

References Cited in the file of this patent

UNITED STATES PATENTS

| | | |
|---|---|---|
| 2,582,480 | Dimond | Jan. 15, 1952 |
| 2,644,895 | Lo | July 7, 1953 |
| 2,827,574 | Schneider | Mar. 18, 1958 |
| 2,889,510 | Carmichael | June 2, 1959 |
| 2,925,585 | Bruce | Feb. 16, 1960 |

FOREIGN PATENTS

| | | |
|---|---|---|
| 762,867 | Great Britain | Dec. 5, 1956 |